United States Patent
Goberna Selma et al.

(10) Patent No.: US 8,800,301 B2
(45) Date of Patent: Aug. 12, 2014

(54) CAPACITIVE SEPARATOR DEVICE

(75) Inventors: Consuelo Goberna Selma, Madrid (ES); José Prieto Barranco, Madrid (ES); David Yañez Villareal, Madrid (ES)

(73) Assignee: Consejo Superior de Investigaciones Científicas (CSIC), Madrid (ES)

( * ) Notice: Subject to any disclaimer, the term of this patent is extended or adjusted under 35 U.S.C. 154(b) by 429 days.

(21) Appl. No.: 13/389,245

(22) PCT Filed: Aug. 17, 2010

(86) PCT No.: PCT/ES2010/070559
§ 371 (c)(1),
(2), (4) Date: Feb. 6, 2012

(87) PCT Pub. No.: WO2011/020939
PCT Pub. Date: Feb. 24, 2011

(65) Prior Publication Data
US 2012/0131931 A1    May 31, 2012

(30) Foreign Application Priority Data
Aug. 17, 2009    (ES) .................................. 200930603

(51) Int. Cl.
 *F25J 3/00* (2006.01)
 *G01F 23/26* (2006.01)
 *B01D 5/00* (2006.01)

(52) U.S. Cl.
 CPC ............ *G01F 23/266* (2013.01); *B01D 5/0042* (2013.01); *G01F 23/268* (2013.01)
 USPC ............... 62/3.6; 62/3.7; 73/61.44; 73/64.56; 73/304 C

(58) Field of Classification Search
 None
 See application file for complete search history.

(56) References Cited

U.S. PATENT DOCUMENTS

| 6,272,906 | B1 | 8/2001 | Fleury et al. |
| 7,523,647 | B2 * | 4/2009 | Scott ............................ 73/61.44 |
| 7,895,891 | B2 * | 3/2011 | Prieto Barranco et al. . 73/304 C |

FOREIGN PATENT DOCUMENTS

| CN | 25740109 | 9/2003 |
| ES | 2249139 | 3/2006 |
| FR | 2692161 | 6/1992 |

OTHER PUBLICATIONS

"PCT International Search Report", PCT International Search Report mailed Dec. 28, 2010, PCT Apln. No. PCT/ES2010/070559 filed Aug. 17, 2010 (2 pages).

\* cited by examiner

*Primary Examiner* — Terry Cecil
(74) *Attorney, Agent, or Firm* — Blakely, Sokoloff, Taylor & Zafman, LLP

(57) ABSTRACT

A device is disclosed which is designed to separate water, hydrocarbons and gases, based on the electric characteristics of the materials; the device utilizes the different capacitance of water and hydrocarbons.

6 Claims, 3 Drawing Sheets

CAPACITIVE SEPARATOR DEVICE

CROSS-REFERENCE TO RELATED APPLICATIONS

The present patent application is a national phase application of International Application No. PCT/ES2010/070559, filed Aug. 17, 2010, which application claims priority to Spanish Application No. P 200930603, filed Aug. 17, 2009.

FIELD OF THE INVENTION

The present invention relates to a three-phase capacitive separator, of gases, hydrocarbons and water, for very small volume systems.

The object of the invention consists of a device based on a pair of capacitive sensors and has been designed to perform the continuous separation of the gases, hydrocarbons and water obtained as the product of chemical reactions in reactors and micro-pilot- or laboratory-scale processing plants.

BACKGROUND OF THE INVENTION

As of today, there are industrial systems capable of separating hydrocarbons and water. The appearance of these two compounds in the fuel tanks of maritime vehicles, during their storage on land, their transport in viaducts or as the result of chemical processes, is very common and the detection thereof has been a subject of study for decades. The need to separate them by means of electromechanical devices is less common, but, nonetheless, it is a problem that has led to the implementation of different systems and methods based on multiple physical principles. They are normally associated with their immiscibility, buoyancy and density difference, for which reason they use gravitational or centrifugal principles. In some cases, in order to determine the level of each component, magnitudes associated with the electric capacity and permittivity, etc., are measured.

The size of the instruments, the precision thereof and the range of working pressures whereat they operate are critical limitations when using these systems in micro-pilot- or laboratory-scale processing plants, where large system dead volumes are detected and it is necessary to work at high pressures.

Spanish invention patent ES2249139 discloses a capacitive-level sensor device designed to separate two phases, a liquid phase and a gaseous phase; this device has the disadvantage that it is equipped with only one isolated probe and only separates a liquid phase from a gaseous phase with a measurement level precision of up to 100 µm.

Focusing on the current state of the technology available for application to the type of systems discussed, with a total volume of a few $cm^3$, we may state that there is no system in the market designed to separate gases, hydrocarbons and water which may satisfactorily resolve these problems given the size specifications required for a continuous-operation micro-scale laboratory equipment or reactor.

SUMMARY OF THE INVENTION

The device of the invention is based on the different electric capacitance of these three phases and their immiscibility, in order to, starting from these differences, determine the volume of each, discriminating between them and separating them with precision. Moreover, the separator system of the invention makes it possible to obtain a controlled outflow of gases, a considerable reduction in the system dead volumes and to work at high pressures (up to 400 bar), all of which are very relevant for the optimal operation of the aforementioned equipment.

To this end, it is developed a separator device with a tank that may be made of metal, a metal alloy or any conducting material, with a total volume capacity between 3 and 20 $cm^3$, which is equipped, at least, with one inlet and three outlets; wherein two probes electrically isolated from the rest of the device are introduced, thereby allowing for the hermetic sealing of the tank at pressures lower than 400 bar. Said probes may have a seal with a gasket made of insulating material.

One of these probes is designed to measure the hydrocarbon level, whereas the other is designed to measure the water level; jointly with the tank walls, said probes constitute two electric condensers, such that the fluids contained in the tank act as a dielectric.

As described above, the operation of the separator device is based on the capacitance of the elements to be separated; in order to measure said capacitance, the device is equipped with two RC oscillator circuits that measure the variation in the electric capacity of the electric condensers formed by the measurement probes and the tank walls; for this reason, a first RC oscillator circuit measures the electric capacity of the electric condenser formed by the hydrocarbon level measurement probe and the tank walls, which generates a frequency signal proportional to said electric capacity; whereas a second RC oscillator circuit, analogous to the first, measures the variation in the electric capacity of the electric condenser formed by the water level measurement probe and the tank walls, which generates a frequency signal proportional to said electric capacity.

Unlike the sensor device described in ES2249139, the device of this invention makes it possible to separate gases from liquids and, in turn, immiscible liquids, such as water and hydrocarbons. To this end, it is equipped with two probes, the hydrocarbon probe having a greater length than the water probe, such that the signal it provides has a greater range, since hydrocarbons have a lower capacitance than water.

Other distinctive characteristics with respect to the aforementioned device are the fact that, in the device of the invention, the inflow of the fluid to be separated is made through the opening located below the level that the two liquid phases to be separated reach in the stationary state, which favours the condensation of the condensable compounds; in turn, the water probe is introduced through a side of the tank, for which reason this probe signal is not affected by the accumulation of possible solid residues, which, in the case of the device of the invention, are evacuated through the bottom of the tank, jointly with the separated water. This arrangement of the water probe prevents the liquids, once condensed, from falling thereon and affecting the signal that it provides.

Moreover, the device is equipped with two reference RC oscillator circuits that operate in parallel and at the same temperature as the aforementioned RC oscillator circuits; therefore, we have a reference RC oscillator circuit, which operates in parallel and at the same temperature as the hydrocarbon probe oscillator circuit, which makes it possible to compensate for the errors caused by the variations in temperature of the hydrocarbon level measurement RC circuit, and a reference RC oscillator circuit analogous to the former, which operates in parallel and at the same temperature as the water probe oscillator circuit and makes it possible to compensate for the errors caused by the variations in temperature of the water level measurement RC circuit.

In order for the separator device to make the necessary measurements, there are two electronic measurement devices, one designed to measure the hydrocarbon level and the other designed to measure the water level. Each is capable of converting two frequency signals (a level-measurement signal and a thermal compensation signal) into electrical signals capable of being read by typical reading devices (displays) or control devices (controllers) that may act on the corresponding outlet means, the hydrocarbon outlet means and the water outlet means.

As an additional provision, if necessary, the device may incorporate a refrigeration system, such as, for example, a system based on Peltier cells.

The device described above makes it possible to operate with a small dead volume in systems which operate at high pressures.

BRIEF DESCRIPTION OF THE DRAWINGS

In order to supplement the description being made and contribute to a better understanding of the characteristics of the invention, in accordance with a preferred practical embodiment example thereof, a set of drawings is attached as an integral part of said description, where the following has been represented for illustrative, non-limiting purposes.

DETAILED DESCRIPTION OF THE INVENTION

In light of the figures, below a preferred embodiment of the separator device of this invention is described.

Figure 1:
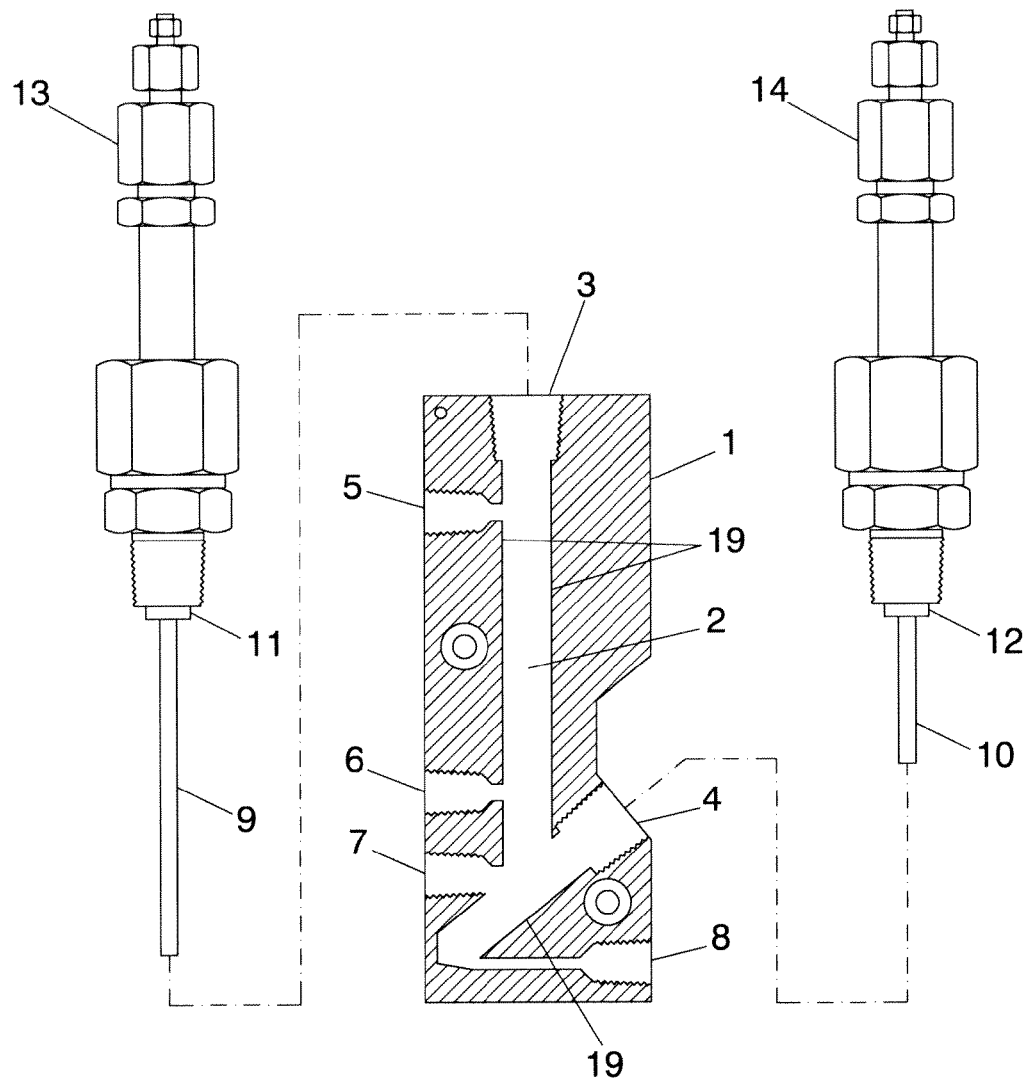
FIG. 1.—Shows a schematic representation of an elevation section pertaining to the separator device of the invention.

A number of machinings are performed in a body (1), preferably metallic, in order to generate a tank (2) in the interior thereof which has a complex geometry and a capacity of about 10 cm$^3$, as may be observed in FIG. 1, preferably made of stainless steel, the geometry whereof corresponds to a rectangular parallelepiped with a lateral groove that facilitates the housing of a water probe (10). The tank (2) obtained is endowed with a longitudinally perforated part and an obliquely perforated part. Both have a 9-mm diameter and come together at the level where a fluid inlet (7) is located.

The tank (2) acts as a thermal condenser to separate three phases, two liquid phases (hydrocarbons and water) and a gaseous phase. Two probes (9) and (10) are placed at both sides of the tank. The tank (2) is perforated in a solid part (1), the geometry whereof corresponds to a rectangular parallelepiped; this diagram shows the upper threaded opening (3) wherethrough a hydrocarbon probe (9) is introduced, designed to measure the hydrocarbon level, and a lateral threaded opening (4) wherethrough a water probe (10) is introduced, a fluid inlet (7), wherethrough the fluid stream to be separated is introduced, and three outlet means (5), (6) and (8), wherethrough the gases, the hydrocarbons and the water, respectively, exit.

Figure 2:
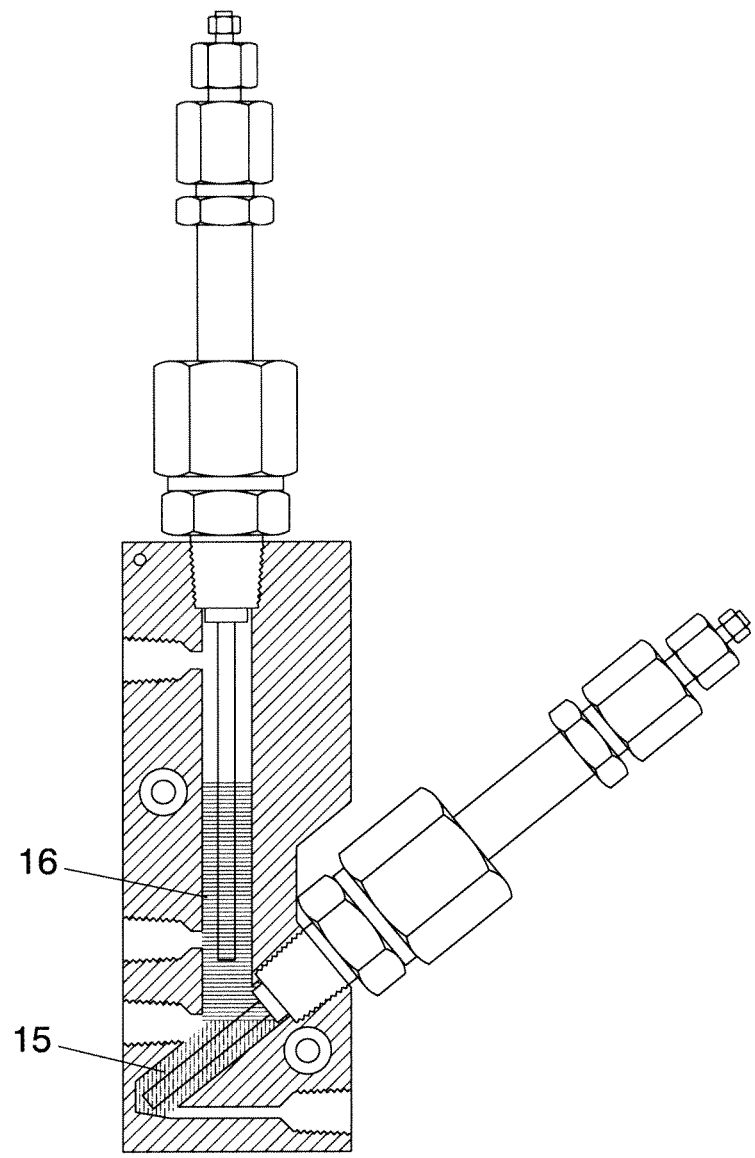
FIG. 2.—Shows a schematic representation of an elevation section of the separator device of the invention once assembled.

In light of FIG. 2, the special parallelepiped configuration of the body (1) allows for the refrigeration thereof such that it may act as a thermal condenser; thus, the tank (2) operates as a liquid-gas separator, condensing, in the inner walls, the compounds with the highest condensation point, which are introduced into said tank (2) through the fluid inlet (7), the liquid being collected in the lower part. Since the liquid mixture contains immiscible compounds with different densities, the lightest ones, made up of a hydrocarbon mixture (16), remain floating on the heaviest, in this case water (15).

Refrigeration of the tank (2) is performed by means of a Peltier cell (not shown), by placing the cold plate of said cell in contact with one of the plates of the solid part with the greatest surface area (1), whereon the tank (2) has been perforated. In order to obtain a decrease in temperature in this body (1), and consequently in the tank (2), a difference in potential is applied between the plates of the Peltier cell, which generates a temperature difference of approximately 30° C. between said plates (Peltier effect). Thus, one of the plates (the one not in contact with the body (1)) could increase its temperature, and the heat must be eliminated using a forced-convection heat sink in order to evacuate the calories extracted. The temperature of the cold plate (in contact with the body (1)) will then decrease to −5° C., thereby achieving a temperature close to 0° C. in said body (1) and, thanks to this, the condensation of those compounds with a condensation point equal to or greater than this temperature.

Subsequently, the water probe (10) and the hydrocarbon probe (9) are built, starting from two solid stainless steel parts 3 mm in diameter and 175 mm and 140 mm in length, respectively. Coupled onto these parts are Teflon insulating parts; a first insulating part (11) and a second insulating part (12) obtained with a precision drill from solid cylinders of this material; as well as the necessary fittings, a first fitting (13) and a second fitting (14), in order to seal the tank (2) once the probes (9, 10) have been introduced therein. The lower part of the hydrocarbon probe (9) is introduced into the tank (2) through the upper part thereof (3) and the lower part of the water probe (10) is introduced into the groove area through the opening (4). The two probes are electrically insulated from the tank walls (2) through the parts made of insulating material, (11) and (12), which, moreover, reduce the dead volume of the tank (2).

The probes (9, 10) are equipped with a thread sealing system and an elastomeric gasket, compatible with a large number of chemical substances, which allows for sealing of the tank (2) and the insulation thereof from the exterior when so required, even when the pressure in the interior reaches 400 bar.

Figure 3:
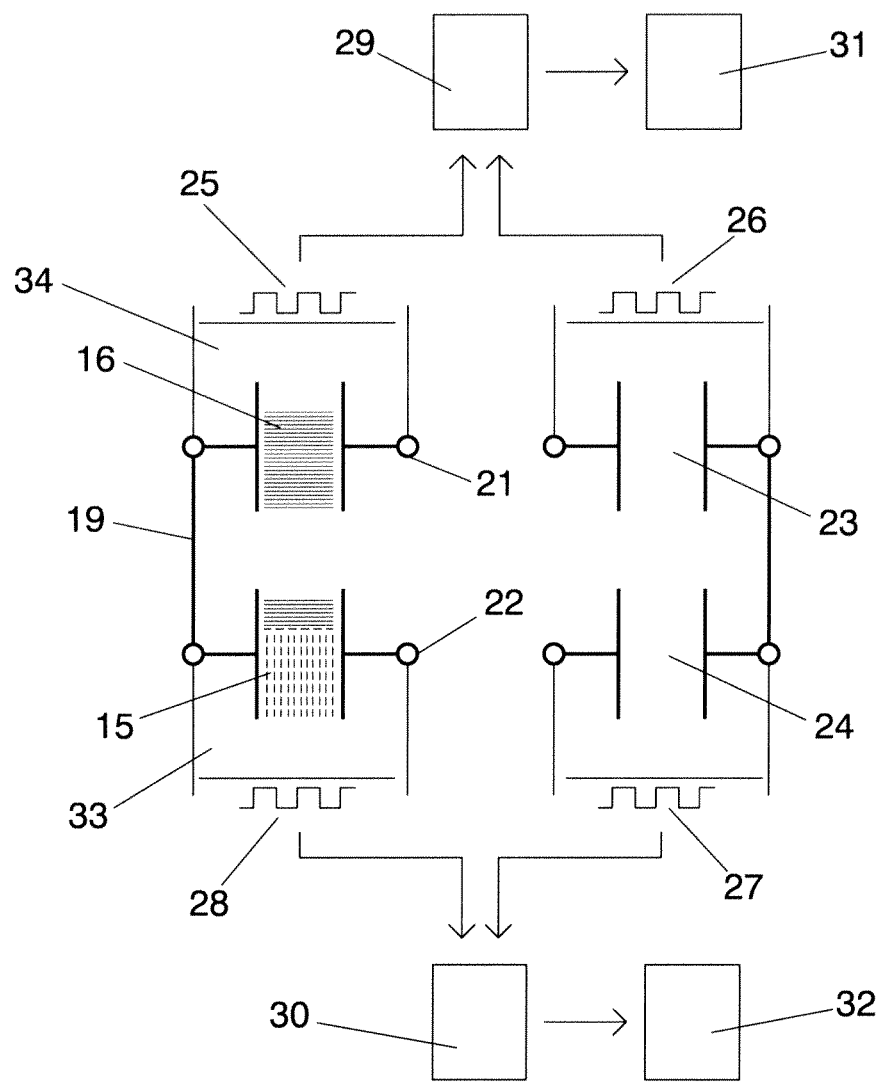
FIG. 3.—Shows a schematic representation of the system signals and control elements.

Subsequently, four oscillator circuits are assembled in accordance with the diagram shown in FIG. 3, where each is equipped, respectively, with: a water measurement condenser (33), a hydrocarbon measurement condenser (34), a reference water condenser (24) and a reference hydrocarbon condenser (23), wherewith four frequency signals will be obtained. One is proportional to the water level and is a water level signal (28); another is a reference water level signal (27), which is used to compensate for the drift caused by the variation in temperature in the water probe oscillator circuit; the third is proportional to the hydrocarbon level, a hydrocarbon level signal (25); and the fourth and last is a reference hydrocarbon level signal (26), which will be used to compensate for the drift caused by the variation in temperature in the hydrocarbon probe oscillator circuit. The two signals, (25) and (26), generated to measure the hydrocarbon level are introduced into a hydrocarbon level measurement module (29), to provide a 4-20-mA electrical signal capable of being read by a hydrocarbon outlet control module (31), which regulates the exit of the hydrocarbon condensed in the tank. The same applies to the water; a water level measurement module (30) receives the two signals, (27) and (28), generated to measure the water level, to provide a 4-20-mA electrical signal capable of being read by a water outlet control module (32), which regulates the exit of the water condensed in the tank.

The upper part of each probe (9, 10) will act as an electric contact for each of the conductors (21, 22) of each electric condenser (23, 24). The body (1) is common to both probes (9, 10) and acts as a common conductor (19).

The invention claimed is:

1. Capacitive separator device comprising:
   a body formed by a solid part and a tank perforated in said solid part, defined by tank walls, said tank including an upper threaded opening, a lateral threaded opening, a fluid inlet adapted for the introduction of a fluid to be separated inside the tank into gases, hydrocarbon and water, and at least three outlet means adapted for the outflow of gases, hydrocarbon and water, respectively,
   a hydrocarbon probe fixed in the upper threaded opening which reaches the interior of the tank,
   at least one hydrocarbon level measurement condenser formed by said tank walls, the hydrocarbon separated from the fluid, which acts as a dielectric, and the hydrocarbon probe,
   a first oscillator circuit connected to the hydrocarbon level measurement condenser which measures the electric capacity of said hydrocarbon level measurement condenser and which generates a frequency signal proportional to said electric capacity providing a hydrocarbon level signal,
   a first reference oscillator circuit which operates in parallel and at the same temperature as the first oscillator circuit, which generates a reference hydrocarbon level signal and compensates the errors caused by the variations in temperature of the first oscillator circuit,
   a hydrocarbon level measurement module connected with the first oscillator circuit and with the first reference oscillator circuit that receives the hydrocarbon level signal and the reference hydrocarbon level signal respectively,
   a water probe fixed on the lateral threaded opening which reaches the interior of the tank,
   at least one water level measurement condenser formed by said tank walls, the water separated from the fluid, which acts as a dielectric, and the water probe,
   a second oscillator circuit connected to the water level measurement condenser which measures the electric capacity of said water level measurement condenser and which generates a frequency signal proportional to said electric capacity providing a water level signal,
   a second reference oscillator circuit which operates in parallel and at the same temperature as the second oscillator circuit, which generates a reference water level signal and compensates the errors caused by the variations in temperature of the second oscillator circuit, and
   a water level measurement module connected with the second oscillator circuit and with the second reference oscillator circuit that receives the water level signal and the reference water level signal respectively.

2. The device of claim 1, further comprising a refrigeration system designed to refrigerate the solid part and the tank.

3. The device of claim 2, wherein the refrigeration system comprises at least one Peltier cell the cold plate whereof is in contact with the solid part.

4. The device of claim 1, wherein the solid part and the probes are made of a material selected from: a metal, a metal alloy and a conducting material.

5. The device of claim 4, wherein the metal parts of the probes are made of stainless steel.

6. The device of claim 5, wherein the probes comprise a seal with a gasket made of insulating material.

* * * * *